United States Patent

Phillips

[15] 3,675,481
[45] July 11, 1972

[54] MOLDED PLASTIC FLOWMETER

[72] Inventor: James W. Phillips, Michigan City, Ind.

[73] Assignee: Dwyer Insturments, Inc

[22] Filed: Dec. 7, 1970

[21] Appl. No.: 95,472

Related U.S. Application Data

[63] Continuation-in-part of Ser. No. 722,931, April 22, 1968.

[52] U.S. Cl. .................................................................73/209
[51] Int. Cl. .........................................................G01f 1/00
[58] Field of Search .......................73/207, 208, 209, 210

[56] References Cited

UNITED STATES PATENTS

| | | | |
|---|---|---|---|
| 2,490,792 | 12/1949 | Fischer | 73/209 |
| 2,707,879 | 5/1955 | Dwyer | 73/209 |
| 3,232,107 | 2/1966 | Busillo | 73/209 |
| 3,342,068 | 9/1967 | Metzger | 73/209 |
| 3,416,370 | 12/1968 | Kaucher et al. | 73/209 |

*Primary Examiner*—Richard C. Queisser
*Assistant Examiner*—Marvin Smollar
*Attorney*—Mann, Brown & McWilliams & Bradway

[57] ABSTRACT

A flowmeter with the tapered tube and conduit fittings specially formed as a one-piece plastic construction to retard breakage and to minimize fragmentation. A sectionally formed mounting plate assembly has pipe threaded bushings mounted to insert into and thereby connect with the conduit fittings and integral flowmeter tube. The mounting plate is sectionally formed so that it can expand and contract with expansion and contraction of the flowmeter tube. The mounting plate takes much of the piping connection strains without transmitting these to the flowmeter tube.

14 Claims, 17 Drawing Figures

INVENTOR
JAMES W. PHILLIPS

ATTORNEYS

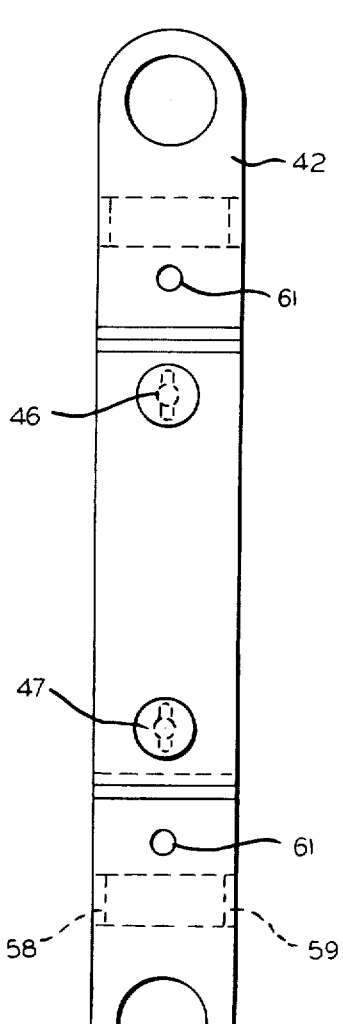
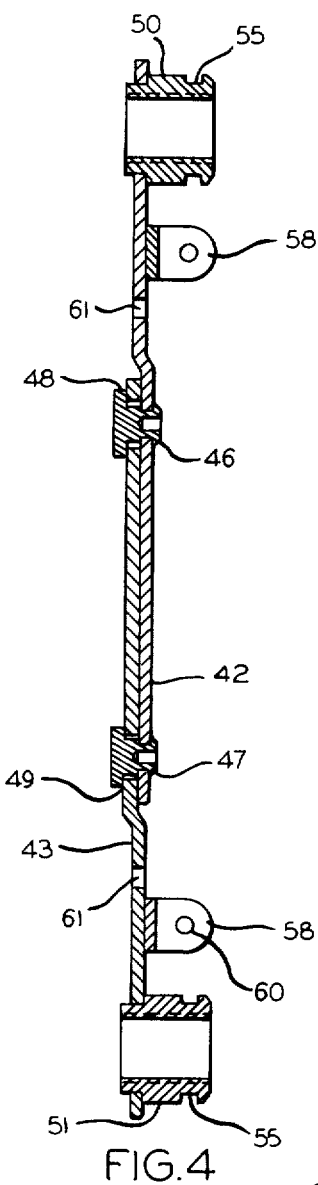
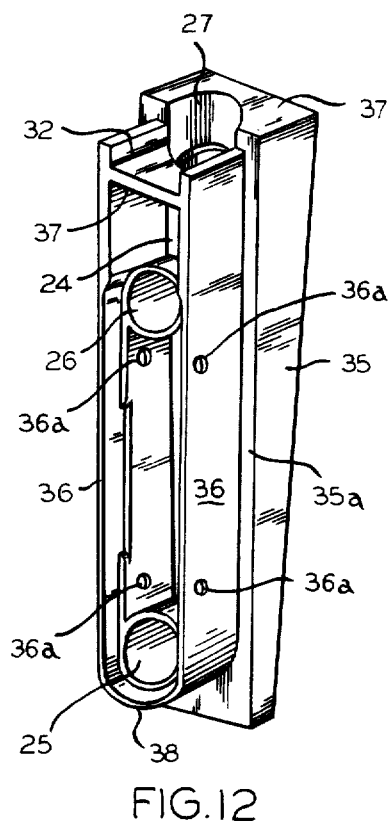
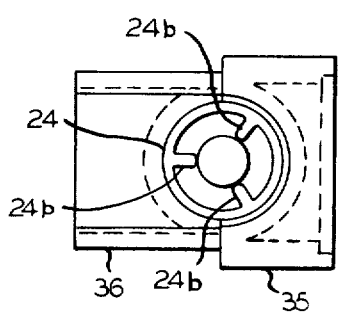
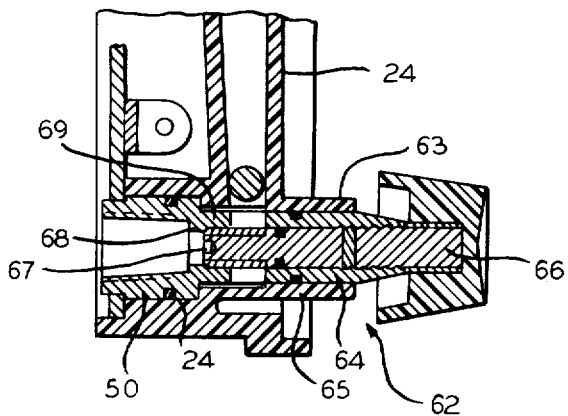

INVENTOR
JAMES W. PHILLIPS
BY Mann, Brown & McWillis

ATTORNEYS

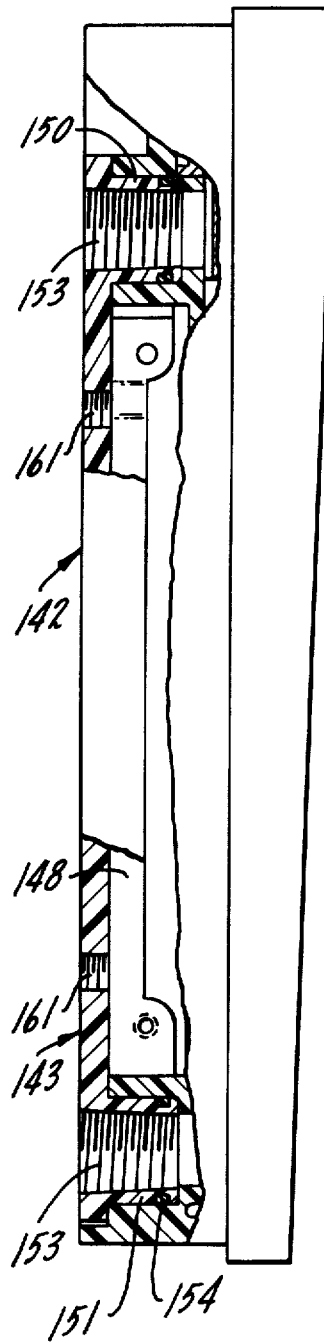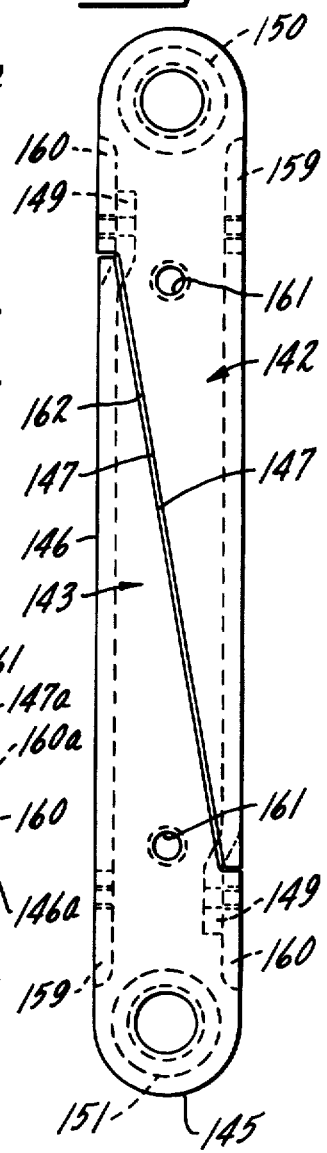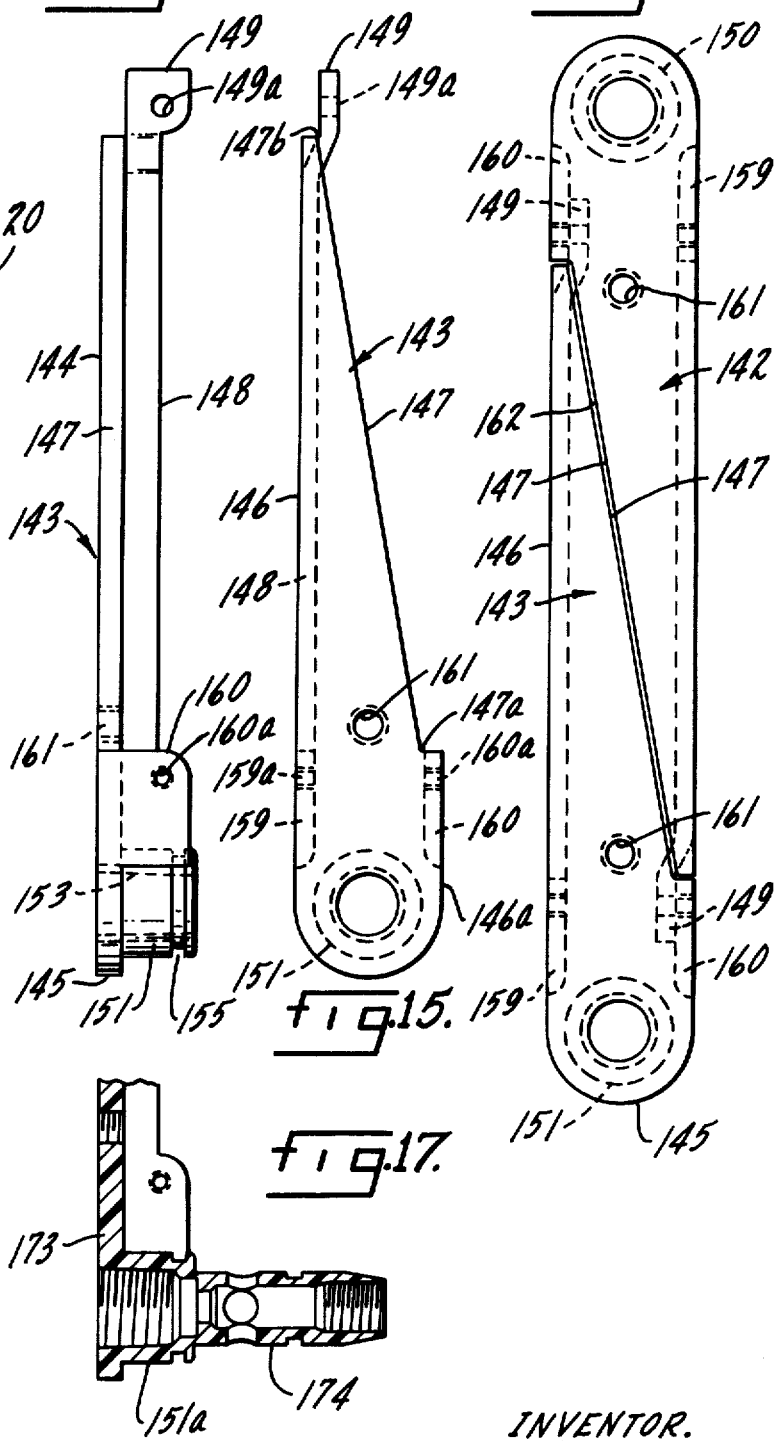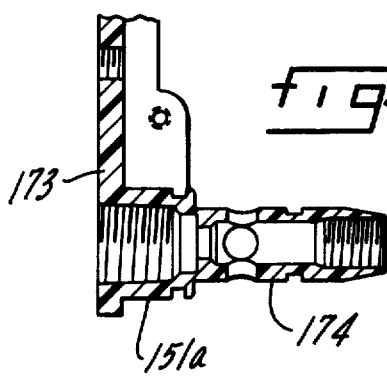

MOLDED PLASTIC FLOWMETER

This application is a continuation in part of my copending application Ser. No. 722,931, filed Apr. 22, 1968.

The present invention is directed to new and useful improvements in flowmeters and is particularly concerned with improvements which facilitate the manufacture and use of such flowmeters.

The primary purposes of the present invention are to form a flowmeter in such a manner that most of the flow meter is formed as a unitary plastic construction, thus permitting simplified manufacturing procedures, to so arrange a flowmeter that it is quickly and easily connected to or disconnected from the piping, thus facilitating assembly and disassembly of the flowmeter for installation and for cleaning purposes, and to so arrange piping connections for flowmeters of this class that the flowmeter tube may easily expand and contract with changes of temperature without substantial resistance from mounting facilities for the flowmeter, these and other purposes of the invention being more apparent in the course of the ensuing specification and claims when taken in conjunction with the accompanying drawings, in which:

FIG. 4 is a sectional view of a mounting plate assembly utilized in the flowmeter of FIGS. 1, 2 and 3;

FIG. 5 is a plan view of the mounting plate assembly illustrated in FIG. 4; FIG. 6 is a sectional view of a portion of a flowmeter incorporating the principles of the invention while including a modification thereto;

FIG. 11 is a top view of a modified flowmeter body; and

FIG. 12 is a perspective view of the flowmeter body of FIGS. 7, 8 and 9;

FIG. 13 is a modified form of the invention utilizing the same basic unitary float tube disclosed in FIGS. 1–3, 7–9, 11 and 12 but with a modified form of backing and mounting plate;

FIG. 14 is a detailed side view of either of the two sections of the backing plate assembly illustrated in FIG. 13;

FIG. 15 is a plan view of the backing plate section illustrated in FIG. 14;

FIG. 16 is a rear view of the backing plate assembly illustrated in FIG. 13; and FIG. 17 is a sectional view of a backing plate section similar to the section illustrated in FIGS. 14 and 15 while modified in the region of the conduit receiving portion thereof to provide a regulating valve assembly.

Like elements are designated by like characters throughout the specification and drawings.

Figure 3:
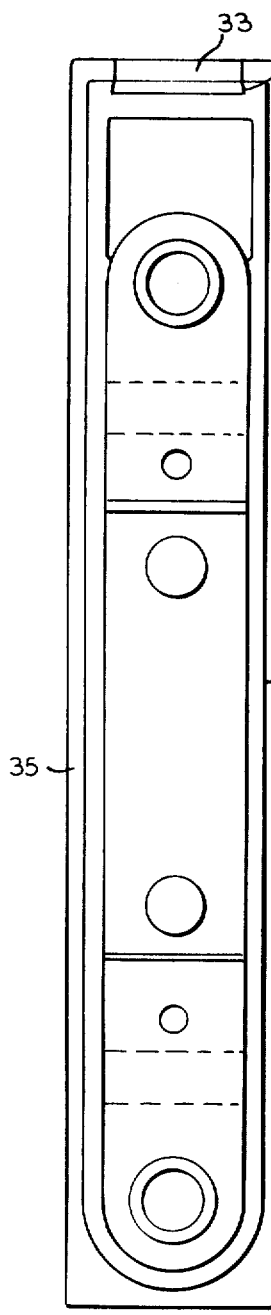
FIG. 3 is a back view of the assembled flowmeter of FIG. 1.
Figure 2:
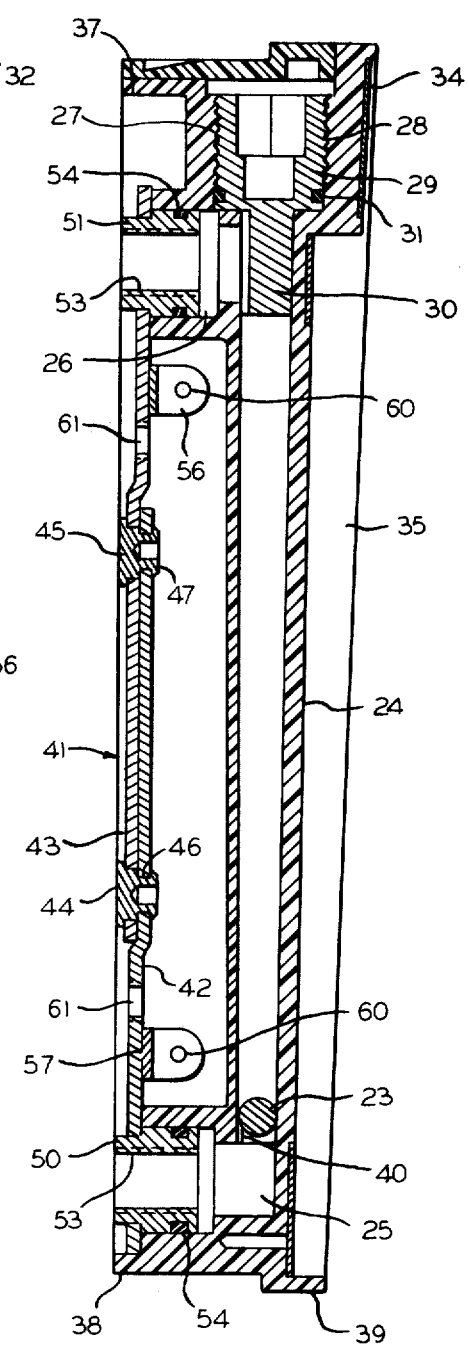
FIG. 2 is a sectional view of the flowmeter illustrated in FIG. 1.
Figure 1:
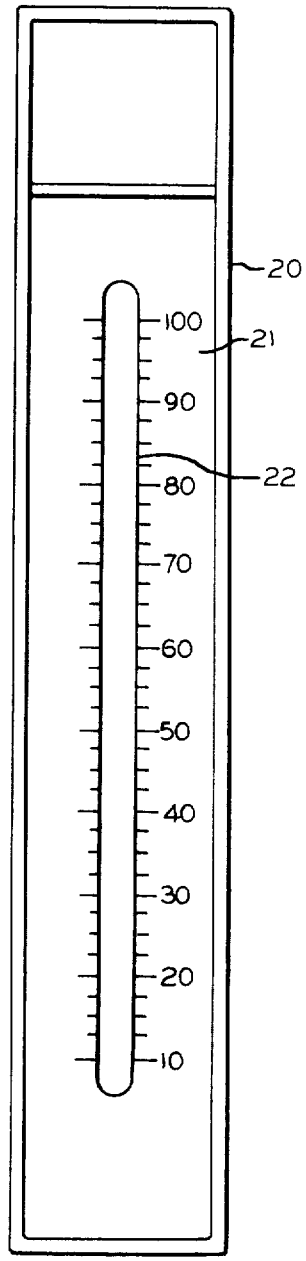
FIG. 1 is a front view of an assembled flowmeter incorporating the principles of the present invention.
Figure 8:
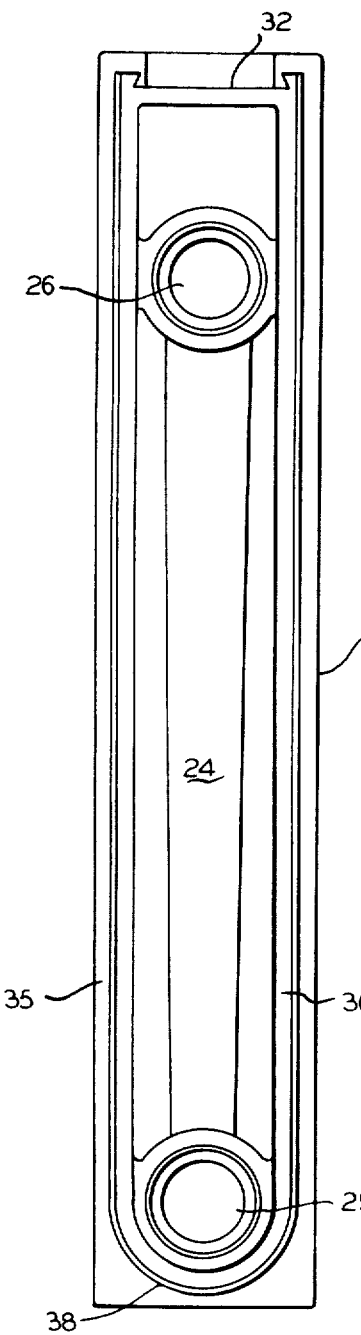
FIG. 8 is a rear view of the flowmeter body illustrated in FIG. 7.
Figure 7:
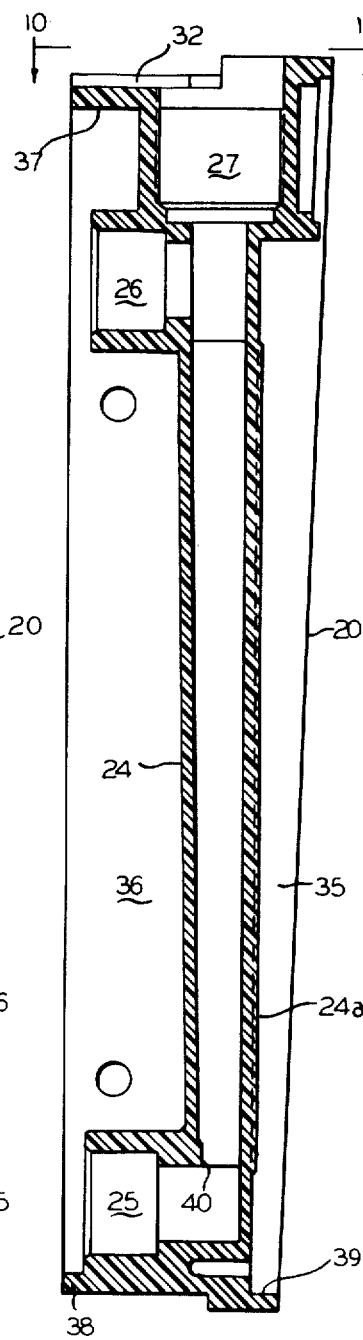
FIG. 7 is a side view of the unitary flowmeter body illustrated in FIGS. 1, 2 and 3.
Figure 9:
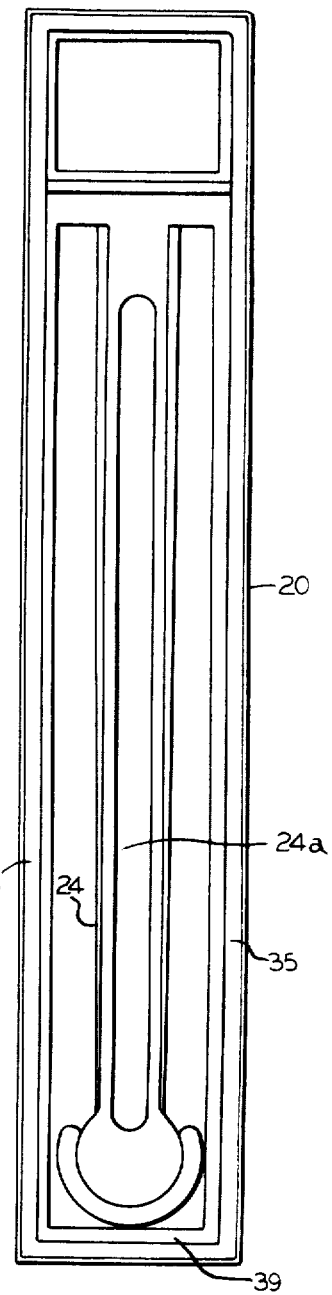
FIG. 9 is a front view of the flowmeter body illustrated in FIGS. 7 and 8.
Figure 10:
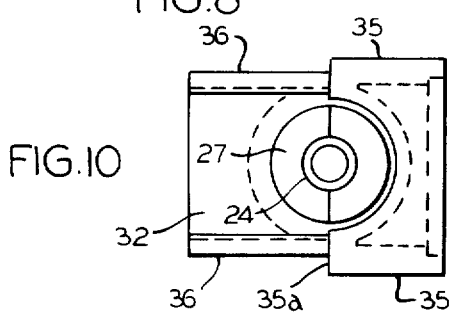
FIG. 10 is a top view of the flowmeter body illustrated in FIGS. 7, 8 and 9.

With specific reference now to the drawings, and in the first instance to FIG. 1, the numeral 20 generally designates a flowmeter body which is elongated and generally rectangular in outline as may be appreciated from the illustrations in FIGS. 1–3, 7, 8, 9 and 10. The front of the body is adapted to carry a graduated scale 21 with appropriate indicia thereon indicating flow rate as in cubic feet per minute of some other unit of measurement. Scale 21 may take the form of a separate plate including an elongated window or recess 22 for viewing the position of an indicating float element in the form of a ball 23. The body 20 is formed as an integrally molded member with a central upwardly diverging tapered float tube portion 24 which is aligned with the viewing window or recess 22 of the scale and which carries the float element 23 therein at a position corresponding to flow rate of the fluid stream passing through the body. The front of the tubular portion 24 may be formed with a flat surface 24a to enhance viewing of the float within the tube. The body is molded so as to provide a tubular portion defining an inlet passage 25 at the lower end of the body and a tubular outlet passage 26 at the upper end of the body. The passages 25 and 26 are in communication with the passage through the float tube portion of the body. Both tubular portions are molded integrally with the body. The passages 25 and 26 are formed with their axes extending generally perpendicular to the longitudinal axis of the tube 24. Body 20 includes an upper tubular cavity 27 which is coaxially aligned with the axis of the float tube portion 24. The tubular cavity is screw-threaded as at 28 and receives a threaded ball stop 29 therein. Ball stop 29 includes a downwardly projecting reduced portion 30 which is received within the upper end of the tapered float tube portion 24. The reduced portion 30 extends beneath the passage 26 to limit the upper movement of the float element 23. The upper and larger portion of the ball stop carries an O-ring seal 31 in a groove in the wall thereof which seals the recess with respect to the flow through the float tube portion 24.

The top of the body 20 may be recessed as indicated at 32 so as to slidably receive a cover element 33 which overlies the cavity 27.

The upper end of the body 20 may carry a suitable name plate or the like 34.

The body 20 is preferably molded with forwardly facing and rearwardly facing skirt portions 35 and 36 which extend over the major portion of the length of the body at each side thereof. The body 20 is formed so that an upper skirt portion 37 is defined at the top of the body between the side portions 36 and a forwardly facing skirt portion 37a spans the forwardly facing skirt portion 35. Lower skirt portions 38 and 39 are defined at the lower portion of the body so as to match the front to rear dimensions of the skirt portions 35 and 36 at the sides of the body. The rearward and lower skirt portion 38 may be rounded. The body is formed so that the tubular portions of the body which define the passages 25 and 26 as well as the float tube portion 24 are within the outlines of the skirt portions of the body. The rearwardly facing skirt portions 36 are spaced more closely together than the forward skirt portions 35 to define a shoulder 35a in a plane generally parallel to the axis of the tubular portion 24. The tapered tubular portion 24 is thus within and spaced from the skirt portions. A narrow web of material may span the space between tubular portion 24 and the skirt portions 35.

Skirts 36 may have an increased thickness between portions 25 and 26 as is illustrated. It is advantageous to provide a slight inclination of the front edges of skirt portions 35 with respect to the longitudinal axis of float tube portion 24, as will be appreciated in FIGS. 2 and 7 so as to generally match the taper of the float tube.

The lowermost end of the body which defines the float tube portion 24 is molded with a dimple 40 which provides a ball stop at the lower portion of the float tube portion 24.

It should be understood that the amount of taper of the passage in the float tube portion may be varied from installation to installation to accommodate varying capacities of flow rate measurement as is known to the art. The float tube portion may be molded with inwardly projecting and spaced ribs 24b as is seen in FIG. 11 to provide float stabilizing guides in the larger float tubes. Also, the length of the float tube portion may be varied (with or without varying the amount of taper) for the same purpose.

In accordance with the invention, a mounting plate assembly generally designated at 41 is received within the overall outline of the body at the rear portion thereof. The mounting plate assembly includes a pair of overlapped and elongated plates 42 and 43. The two plates 42 and 43 are connected together for relative endwise movement as by means of rivets 44 and 45 which are snugly received with apertures 46 and 47 in one of the plates and which are received in slightly elongated apertures 48 and 49 respectively in the other plate.

This connection allows a limited amount of relative movement of the upper and lower plates relative to one another in the direction of their length.

One plate 42 carries a tubular insert 50 and the other plate 43 carries a tubular insert 51. These inserts are adapted to be received within the passages 25 and 26. These inserts are fixed to the plates 42 and 43 as by press fits or welds. The inserts 50 and 51 are internally threaded as indicated at 53 for receiving a suitable threaded conduit fitting. The inserts 51 and 52 each have O-rings 54 which are carried in grooves 55 formed in the walls of the inserts to form a seal with the internal wall of the passages 25 and 26.

The mounting plate assembly includes upper and lower brackets 56 and 57 which are fixed to the upper and lower plates respectively and which include spaced flanges 58 and 59 which are positioned within the outline of the mounting plate assembly. The flanges are preferably screw-threaded as at 60 so that they may receive suitable screws for holding the mounting plate assembly within the skirt of the molded plastic body. Such screws may be passed through apertures 36a in the skirt. The upper and lower plates may also be formed with screw-threaded apertures 61 for purposes of supporting the mounting plate on a wall or panel surface with the back of skirt 36 flush against the surface. Clamp brackets may also be used in conjunction with apertures 61 and suitable screws to clamp the body within a panel cut out for this purpose.

FIG. 6 illustrates a modified form of body which is in all respects the same as the assembly illustrated in the remaining figures with the exception of the lower portion of the float tube body. In FIG. 6, the body is modified to provide for a control valve generally designated at 62. In this case the body, when molded, is formed with a tubular portion 63 which is generally axially aligned with the tubular portion 25 and which projects forwardly of the skirt of the body. The tubular portion 63 has a sleeve or valve body 64 inserted or received therein and sealed thereto as by an O-ring 65. A valve stem 66 is threadably received within the sleeve or valve body and includes a valve member 67 at the inner end thereof which is adapted to seal against a valve seat 68 which is formed on an extension 69 of the lower coupling or valve body insert 50.

When mounting the flowmeter, the assembled plates 42 and 43 may first be fixed to a supporting wall or member as by means of screws passed through the threaded apertures 61 or as by use of attaching brackets with screws or bolts which are threaded into the threaded apertures 61 to hold the body within a panel cut out for this purpose. Inlet and outlet conduit fittings are then threaded into the fittings 50 and 51. The flowmeter body may be then simply pushed on over the coupling inserts 50 and 51 and the O-rings 54 seal the passages leading to the float tube portions 24. The flowmeter may then be fixed to the mounting plate assembly 41 with screws that enter the threaded openings 60 through openings 36a in the molded body.

As formed, the longitudinal axis of the tapered float tube portion is generally parallel to the plane of the faces of the skirt portion at the rear of the flowmeter body and with the axes of the tubular connecting portions of the body extending at right angles to the axis of the float tube portion. The plane of the front skirt of the body is close to parallelism with the taper of the float tube wall portion. The inwardly offset positioning of the rearward skirt portions of the body with respect to the front skirt portions enables the rearward portion of the body to be recessed neatly within an opening in a wall or panel wherein the mounting surface is positioned snugly against the shoulder between the front and rear skirt portions. The flowmeter may also be mounted with the rear face of the body flush against a mounting surface or with the body substantially entirely recessed within a mounting surface. Since the float tube is at the front portion of the body, light reaches the flowmeter scale section of the body and the float therein relatively easily for viewing of the float and scale. In either a flush mounting position or a recessed mounting position the mounting plate assembly is held snugly within the confines of the rearwardly facing skirt portions of the body, which lends neatness of appearance to the assembly.

The float tube portion may be lighted from the rear of the float tube body and the position of the float within the body is still nonetheless easily read.

The particular mounting and stiffening arm assembly provides what is in effect a "backbone" for the flowmeter body. The sectional formation of this arm allows the flowmeter body and arm to expand and contract differently from one another without putting adverse strains on the flowmeter body. Such expansion and contraction may be due to such factors as varying temperature, etc. Also, in this regard, the tubular insert fittings carrying pipes or the like may be comparatively loosely mounted and received within the flowmeter body while being welded to the stiffening arm. The strains of the piping threads are thereby received by the stiffening arm while minimizing the transmission of any of these strains to the flowmeter body.

FIGS. 13–17 illustrate a modified form of sectionally formed backing and mounting plate assembly which may be utilized with the flowmeter bodies illustrated in FIGS. 1–12. In FIGS. 13–17 the backing and mounting plate assembly is also formed with sections which are connected together for limited relative sliding movement in directions generally parallel to the axis of the flowmeter tube. The sections carry tubular pipe fittings with internal threads for fixing fluid pipes thereto, as in FIGS. 1–12, and these pipe fittings are adapted for a slip fitting relation within the upper and lower bores of the flowmeter body as in FIGS. 1–12. The sections are formed from a rigid molded plastic material such as a glass filled polycarbonate plastic.

In FIGS. 13 through 17 the backing and mounting plate assembly is formed from two sections 142 and 143, which instead of overlapping as in FIGS. 1 through 12, extend along side of one another. Each section 142 and 143 has tubular pipe fittings 150 and 151 respectively, which are molded integrally therewith. Each pipe fitting 150 and 151 is formed on an axis extending at right angles to the extension of the two sections 142 and 143. Each pipe fitting is internally threaded as at 153 and has an O-ring receiving groove milled around the circumference thereof to receive an O-ring 154 as in FIGS. 1 through 12. Each of the pipe fittings are adapted to be received within the tubular inlet and outlet fitting of the flowmeter body (as seen in FIG. 13) in the same manner that the pipe fittings 50 and 51 are fitted in FIGS. 1 through 12.

In FIGS. 13 through 17 the two sections are identically formed. The section 143 is illustrated in FIGS. 14 and 15. Each of the molded sections, for example, is formed as an elongated arm of plate-like form 144 which extends transversely to the axis of the pipe fitting. The arm spans the tubular pipe fitting and extends a slight distance therebeyond at one end as at 145. This end may be formed as an arc about the axis of the pipe fitting, but on a larger radius. Each arm is formed with one side edge 146, which forms an outer edge of the mounting and backing plate assembly. Each arm is also formed with an opposite side edge which includes a first portion 146a, parallel to edge and extending alongside the pipe fitting and a second portion 147, which is formed on a bias or diagonal so that when the two sections 142 and 143 are positioned alongside one another with edge 147 adjacent to one another, the outer sides 146 define a generally rectangular outline as is seen in FIG. 16.

The side edge portion 147 extends from a point 147a spaced inwardly of edge portion 146a and to a point 147b at a junction with a reinforcing flange 148. This flange is formed at right angles to the body of the arm and extends along most of the length of the arm. Flange 148 terminates at the end of the arm opposite to the pipe fitting carrying end in an offset ear 149, which is offset from the remainder of the rectilinear flange 148 by approximately the thickness of the flange as is seen in FIG. 15. This ear 149 is also offset from the body of the arm by an amount generally equal to the thickness of the arm body as is seen in FIG. 14. This ear includes an apperture 149a for a fastening purpose which will be described. The end of the flange 148 closest to the pipe fitting carrying end also is formed as an ear 159 for a fastening purpose. Another flange 160 extends at right angles to the plane of the arm body alongside edge portion 146a. Each of the ears or flanges 159 and 160 includes fastening appertures 159a and 160a. Each section includes a threaded apperture 161 for receiving fastening screws for attaching the mounting and backing plate assembly to a wall, panel or the like in the manner of the fastening appertue 61 in FIGS. 1 through 12.

The thickness of the flanges, ears and arms are approximately the same.

The arrangement of each section is such that when identical sections are positioned alongside one another, with bias edge portions 147 adjacent to each other, as shown in FIG. 16, the fastening ears 149 and 160 of the two sections are alongside one another, with their fastening appertures 149a and 160a generally aligned with one another and generally aligned with the fastening apperture 159a. Fastening screws may then be passed through these appertures and through apperture 36a in the flowmeter body for the purpose of holding the flowmeter body against disengagement from the mounting and backing plate assembly. The fastening screws are loosely received in the apperture 149a and 159a and 160a so as to allow relative sliding movement of the two sections in a direction generally parallel to the axis of the float tube and perpendicular to the axis of the pipe fitting. When the two sections are assembled, a clearance space as designated at 162 will exist between the bias edge portions 147 and between the end of the arm carrying the ear 149 and to the indented portion at point 147a.

FIG. 17 illustrates a modification wherein the flowmeter is formed with a regulating valve assembly. In this event the pipe fitting 151a of one section 173 is formed with a tubular extension 174, which is formed to receive a regulating valve in a manner similar to that illustrated and described in FIG. 6. Otherwise the section is formed the same as the sections 142 and 143.

As in FIGS. 1-12, the plastic backing and mounting plate assembly is formed so that the sections are connected for relative sliding movement while the slip fit of the pipe fittings allows simple attachment and detachment of the flowmeter body to the assembly and absorbs pipe threading strains.

The slip fit between the plastic flowmeter body and either mounting arm assembly provides for quick attachment to and detachment from the mounting arm. This facilitates removal of the flowmeter body for cleaning purposes. For example, when cleaning the flowmeter body it is removed from the mounting arm by simply removing the four screws through the skirt and brackets of the assembly and then pulling the body forwardly and removing the ball stop. A brush or the like may then be inserted through the ball stop cavity to thoroughly clean the body. The quick attaching and detaching feature also enables different flowmeter bodies of different capacities to be easily connected with the same conduit fittings.

Flowmeter bodies as defined herein may be made of polycarbonate plastic material and, when formed from such material in accordance with the invention, the bodies are substantially shatterproof. This is a clear and tough plastic material which enhances lighting of the scale portion of the flowmeter and viewing of the float within the tapered tube. The particular formation of the body adequately protects the float tube portion of the body as well as the tubular inlet and outlet portions thereof so that when subjected to relatively heavy shock forces, or unusually heavy pressure conditions, the flowmeter body may crack, but it will not shatter.

I claim:

1. A flowmeter assembly including a flowmeter tube having a tapered bore diverging upwardly and a float within said bore, upper and lower spaced tubular inlet and outlet portions communicating with said bore at upper and lower points of said bore respectively, and extending transversely to said bore, a sectionally formed backing and mounting plate assembly having upper and lower tubular pipe fittings, said fittings extending transversely to said bore, said pipe fittings having threads for fixing fluid pipes thereto, said fittings being interfitted with the upper and lower inlet and outlet portions of said tube in a slip fitting relation opposite from the ends where said fluid pipes are fixed, whereby strains from said threads are absorbed by said fittings without substantial transmission of strains to said inlet and outlet portion while allowing assembly and disassembly of said mounting plate assembly and tubular portions by relative movement therebetween in directions transverse to the axis of said tapered bore, and means for sealing said tubular fittings to said tubular portions, said backing plate assembly having upper and lower sections with means for connecting them together for limited relative sliding movement of said sections in directions generally parallel to the axis of said tube when said fittings are positioned within and sealed to said upper and lower tubular portions.

2. The structure of claim 1 wherein said tube and tubular portions are a one-piece molded construction.

3. The structure of claim 1 characterized by and including a regulating valve assembly in said lower tubular portion.

4. The structure of claim 1 wherein said tube has means defining spaced and generally parallel skirt portions extending therefrom, said backing and mounting plate assembly being positioned within the confines of said skirt portions.

5. A flowmeter body as defined in claim 1 characterized by and including a ball stop receiving cavity formed through the upper portion of said body and generally coaxially with the axis of said tapered tubular portion.

6. The structure of claim 1 characterized by and including mounting bracket means associated with one section of said mounting and backing plate assembly.

7. The structure of claim 1 wherein said pipe fittings are formed integrally with sections of said backing and mounting plate assembly, one of said fittings being carried by one section and the other being carried by another section.

8. A flowmeter assembly as set forth in claim 1 wherein said tube and tubular portions are formed as a unitary one piece body of substantially shatterproof plastic material, and an outer skirt formed intergrally with said body and defining the marginal outlines of said body, said skirt having spaced, generally parallel portions overlying said tapered portion and extending laterally from opposite sides of said tapered portion, said spaced portions extending generally parallel to the axes of said upper and lower tubular portions, said spaced portions defining a mounting plate receiving space therebetween to receive said mounting and backing plate therein.

9. The structure of claim 8 wherein said skirt is formed with a forwardly facing portion of said spaced portions extend rearwardly from said tapered tubular portion to define a shoulder between the forwardly facing portion and rearwardly extending portions, said shoulder extending in a plane extending generally parallel to the axis of said tapered tubular portion.

10. The structure of claim 9 wherein said skirt has a forwardly facing portion with forward edges lying in a plane inclined to the longitudinal axis of said tapered tubular portion and inclined downwardly and inwardly with respect thereto.

11. The structure of claim 1 wherein said backing and mounting assembly includes two sections each having an arm connected to a pipe fitting, each arm having one elongated edge adapted to form one side of the backing and mounting plate assembly and an opposite edge portion formed on a bias whereby the opposite edge portions of the two sections may extend alongside one another while said first named edges define the side edges of the backing and mounting plate assemble, and means for connecting said arms together for relative movement in a direction parallel to the axis of said tube.

12. The structure of claim 11 wherein said connecting means includes aligned, apertured ears on said sections and extending transversely to the arms.

13. The structure of claim 12 wherein each section is a unitary plastic construction defining said arm, pipe fitting and ears.

14. The structure of claim 13 wherein each section includes a reinforcing flange extending alongside one side edge at right angles thereto, the flange of each section extending between connecting ears at the pipe fitting end of said arm and at the opposite end thereof.

* * * * *